US012811029B2

(12) United States Patent
Dahl Ryde et al.

(10) Patent No.: US 12,811,029 B2
(45) Date of Patent: Nov. 24, 2026

(54) POWER CABLE WITH MECHANICAL SUPPORT LAYER

(71) Applicant: NKT HV Cables AB, Lyckeby (SE)

(72) Inventors: Christoffer Dahl Ryde, Lyckeby (SE); Håkan Sandell, Karlskrona (SE); Andreas Tyrberg, Lyckeby (SE); Andreas Persberg, Karlskrona (SE); Sonny Långström, Karlskrona (SE); Tommy Johansson, Bräkne-Hoby (SE); Amir Pourrahimi, Västerås (SE)

(73) Assignee: NKT HV Cables AB, Lyckeby (SE)

( * ) Notice: Subject to any disclaimer, the term of this patent is extended or adjusted under 35 U.S.C. 154(b) by 154 days.

(21) Appl. No.: 18/306,685

(22) Filed: Apr. 25, 2023

(65) Prior Publication Data

US 2023/0352213 A1 Nov. 2, 2023

(30) Foreign Application Priority Data

Apr. 29, 2022 (EP) .................................... 22170841

(51) Int. Cl.
*H01B 7/282* (2006.01)
*H01B 3/18* (2006.01)
(Continued)

(52) U.S. Cl.
CPC ............. *H01B 7/2825* (2013.01); *H01B 3/18* (2013.01); *H01B 7/14* (2013.01); *H01B 7/1895* (2013.01);
(Continued)

(58) Field of Classification Search
CPC ...................................................... H01B 9/027
(Continued)

(56) References Cited

U.S. PATENT DOCUMENTS 3,935,042 A * 1/1976 Wahl ........................ H01B 7/02 427/388.2
4,145,567 A * 3/1979 Bahder .................. H01B 9/022 174/13
(Continued)

FOREIGN PATENT DOCUMENTS

EP 2312591 A1 4/2011
EP 3438993 A1 2/2019
(Continued)

OTHER PUBLICATIONS

Extended European Search Report; Application No. 22170841.5; Completed: Oct. 25, 2022; Issued: Nov. 3, 2022; 7 Pages.

*Primary Examiner* — Chau N Nguyen
(74) *Attorney, Agent, or Firm* — Whitmyer IP Group LLC

(57) ABSTRACT

A power cable including: a conductor, an insulation system including an inner semiconducting layer arranged around the conductor, an insulation layer arranged around the inner semiconducting layer, and an outer semiconducting layer arranged around the insulation layer, an elastic mechanical support layer arranged around the outer semiconducting layer, a metallic water blocking layer having a longitudinal weld seam, the metallic water blocking layer being arranged around the mechanical support layer, wherein the mechanical support layer is permanently thermally expanded radially as a result of a heat treatment process, thereby mechanically supporting the metallic water blocking layer.

13 Claims, 2 Drawing Sheets

(51) Int. Cl.
*H01B 7/14* (2006.01)
*H01B 7/18* (2006.01)
*H01B 13/00* (2006.01)
*H01B 13/22* (2006.01)
*H01B 13/24* (2006.01)

(52) U.S. Cl.
CPC ..... *H01B 13/0016* (2013.01); *H01B 13/0026* (2013.01); *H01B 13/221* (2013.01); *H01B 13/245* (2013.01)

(58) Field of Classification Search
USPC ...................................... 174/102 SC, 120 SC
See application file for complete search history.

(56) References Cited

U.S. PATENT DOCUMENTS

| | | | | | |
|---|---|---|---|---|---|
| 4,234,624 | A * | 11/1980 | Linderoth | B29C 35/10 | 427/512 |
| 4,269,638 | A | 5/1981 | Faranetta et al. | | |
| 4,621,169 | A * | 11/1986 | Petinelli | H01B 11/1058 | 174/23 C |
| 5,414,213 | A * | 5/1995 | Hillburn | H01B 11/1826 | 174/105 R |
| 10,886,035 | B2 * | 1/2021 | Sica | B01J 20/267 | |
| 2006/0102376 | A1 * | 5/2006 | Kuchita | H01B 9/027 | 174/102 SC |
| 2013/0168126 | A1 * | 7/2013 | Kuchta | H01B 7/361 | 174/102 SC |
| 2020/0283606 | A1 * | 9/2020 | Koelblin | H01B 3/441 | |
| 2024/0360326 | A1 * | 10/2024 | Waddell | C08J 7/05 | |

FOREIGN PATENT DOCUMENTS

| | | | |
|---|---|---|---|
| EP | 3786982 | A1 | 3/2021 |
| WO | 9933070 | A1 | 7/1999 |
| WO | 2005055250 | A1 | 6/2005 |

* cited by examiner

POWER CABLE WITH MECHANICAL SUPPORT LAYER

TECHNICAL FIELD

The present disclosure generally relates to power cables.

BACKGROUND

Power cables comprise electric insulation to electrically insulate the conductor. A metallic radial water barrier is generally required to prevent moisture from penetrating into the insulation.

Conventionally, the metal used is lead, which is a soft, workable and extrudable metal. A lead moisture shield provides a safe barrier against water penetration but is associated with several disadvantages. For example, a lead moisture shield for use with high voltage cables requires a considerable sheath thickness. This results in a very heavy cable. Furthermore, lead is a toxic material that is hazardous both for humans and for the environment.

It is known to provide power cables with a water barrier in the form of a copper metal sheath that is joined by welding the longitudinal seam, as for example disclosed in EP 2 312 591, EP3 438 993, and EP 3 786 982.

Prior to welding, a metal sheet may be wrapped around the electrical insulation. Opposing edges of the metal sheet are longitudinally welded at a radial distance of about 1-7 mm from the directly underlying layer so as not to damage that layer, thus forming the metal sheath.

After the welding has been performed the metal sheath may be subjected to a diameter reduction process using rollers to decrease the distance between the directly underlying layer and the metal sheath. However, most metals usable for the particular application, such as copper, is harder than lead, which makes them less workable. Depending on the type of metal and the metal material thickness, it may be very challenging or even impossible to perform diameter reduction due to the force that would be required to be applied by the rollers. There is moreover a substantial risk of buckling of the metal material by performing diameter reduction, especially if the metal material is thin.

SUMMARY

A general object of the present disclosure is to provide a power cable that solves or at least mitigates the problems of the prior art.

There is hence according to a first aspect of the present disclosure provided a power cable comprising: a conductor, an insulation system comprising an inner semiconducting layer arranged around the conductor, an insulation layer arranged around the inner semiconducting layer, and an outer semiconducting layer arranged around the insulation layer, an elastic mechanical support layer arranged around the outer semiconducting layer, a metallic water blocking layer having a longitudinal weld seam, the metallic water blocking layer being arranged around the mechanical support layer, wherein the mechanical support layer is permanently thermally expanded radially as a result of a heat treatment process, thereby mechanically supporting the metallic water blocking layer.

The thermal expansion of the mechanical support layer may for example be determined by measuring the volume of a reference sample of a material of which the mechanical support layer is made without having been subjected to heat treatment at a temperature and for a duration of time that triggers thermal expansion, and measuring the volume of a sample of the mechanical support layer after the thermal expansion has taken place, and comparing the two volumes or radial thicknesses.

The temperature used for the heat treatment depends on the type of material used for the mechanical support layer but may for example be above 70° C. such as in a range of 80-190° C. or in a range of 100-260° C., for example in the range 150-260° C., or 150-400° C.

The support provided by the mechanical support layer on the metallic water blocking layer may be direct or indirect.

The mechanical support layer provides support of the metallic water blocking layer around the entire inner circumference of the metallic water blocking layer.

The mechanical support layer may fill up a majority of or all the radial space between the metallic water blocking layer and the outer semiconducting layer due to thermal expansion. The need to reduce the diameter of the metallic water blocking sheath may thereby be eliminated or the amount of diameter reduction required may at least be reduced. There may however, according to one example, be provided a layer of swelling tape radially inside the mechanical support layer, between the mechanical support layer and the outer semiconducting layer, and/or radially outside the mechanical support layer, between the mechanical support layer and the metallic water blocking layer.

Due to the elasticity of the mechanical support layer, the mechanical support layer can dynamically expand and contract to fill the radial gap/space between the outer semiconducting layer and the metallic water blocking layer as the insulation system thermally expands and contracts in response to the variation in the magnitude of the current that flows through the conductor during power cable operation. The mechanical properties of the power cable, including the centring of the conductor and insulation system may thus be maintained during power cable operation.

The mechanical support layer furthermore provides protection against longitudinal water ingression.

The mechanical support layer has been thermally radially expanded during manufacturing of the power cable. The heat treatment process has thus been performed during manufacturing of the power cable.

According to one embodiment the mechanical support layer is permanently thermally expanded radially with a factor of at least 2. The thickness of the mechanical support layer has thus been increased by at least a factor of 2 by the heat treatment process.

The mechanical support layer may have been thermally expanded with a factor of at least 3, such as at least 4, or at least 5, during manufacturing of the power cable.

The mechanical support layer may for example have a radial thickness in the range of 1-5 mm such as 2-4 mm before thermal expansion. The mechanical support layer may have a radial thickness of 2-10 mm after thermal expansion.

The mechanical support layer may have an essentially constant or constant thickness along the circumferential direction, or it may be varied along the circumferential direction. A varied thickness can be achieved by not subjecting the entire circumference of the power cable to heat treatment or it may be due to the fact that the power cable up to the outer semiconducting layer is not entirely circular.

The power cable may be a medium voltage power cable or a high voltage power cable. With medium voltage is herein meant a voltage in the range of 1 kV-72.5 kV. With high voltage is herein meant a voltage above 72.5 kV.

The power cable may be a direct current (DC) power cable or an alternating current (AC) power cable. The AC power cable may be a single phase or multi-phase AC power cable. The DC power cable may comprise one, two, or more than two DC power cores or poles.

The mechanical support layer may comprise an antioxidant. Thermo-oxidation degradation may thereby be reduced or eliminated. An antioxidant furthermore enhances the stability of the mechanical support layer against aging.

According to one embodiment the mechanical support layer comprises polymer foam.

The mechanical support layer may comprise an unexpanded polymer material that turns into the polymer foam by the heat treatment process. The unexpanded polymer material thus becomes thermally expanded.

According to one embodiment the polymer foam comprises thermally expandable microspheres, TEM, embedded in a polymer matrix.

The TEM may for example be Expancel® by Nouryon.

According to one embodiment the polymer matrix comprises polyethylene, polyurethane, polyvinylchloride, ethylene-vinyl acetate, polydimethylsiloxane, or epoxy.

Using polyvinylchloride (PVC) or ethylene-vinyl acetate (EVA) as polymer matrix provides flame retardancy.

EVA has a low melting point compared to polyethylene (PE) and therefore its processing without the risk of early expansion is possible.

Using a polymer matrix facilitates the processing of the material of which the mechanical support layer is made. It for example makes it possible to extrude or co-extrude, and/or crosslink the mechanical support layer.

According to one embodiment the mechanical support layer comprises an intumescent material.

According to one embodiment the intumescent material comprises an acid source, a carbonization agent, and a blowing agent.

According to one embodiment the mechanical support layer is an extruded layer, is in the form of tape wrapped around the insulation system or is a coating on an inner surface of the metallic water blocking layer.

The tape may for example comprise one or more carriers and a polymer foam material arranged on the carrier or between the carriers. The carrier or carriers may for example comprise textile or non-woven fabric.

The metallic water blocking layer may be lead-free.

According to one embodiment the metallic water blocking layer comprises copper, aluminium, or stainless steel.

According to one embodiment the mechanical support layer is semiconducting, and wherein the mechanical support layer electrically connects the metallic water blocking layer with the outer semiconducting layer.

Potential equalisation between the outer semiconducting layer and the metallic water blocking layer may thereby be obtained.

The mechanical support layer may comprise carbon black. In this case, the carbon black provides the semiconducting property of the mechanical support layer.

According to one embodiment the power cable is a submarine power cable. The submarine power cable may be a static or a dynamic submarine power cable.

The power cable may alternatively be an underground power cable.

There is according to a second aspect of the present disclosure provided a method of manufacturing a power cable, comprising: a) providing a conductor, b) providing an insulation system comprising an inner semiconducting layer arranged around the conductor, an insulation layer arranged around the inner semiconducting layer, and an outer semiconducting layer arranged around the insulation layer, c) providing an elastic mechanical support layer around the outer semiconducting layer, d) welding opposing edges of a metallic sheet arranged radially outside of the mechanical support layer longitudinally to form a metallic water blocking layer, and e) heating the mechanical support layer to thermally expand the mechanical support layer permanently, wherein the mechanical support layer is permanently thermally expanded radially, thereby mechanically supporting the metallic water blocking layer.

Step e) may involve heating the mechanical support layer to thermally expand the mechanical support layer permanently with a factor of at least 2.

Step e) may be performed simultaneously with step c), or simultaneously with step d), or after step d).

While the heating may be performed before, during, or after step d), preferably the mechanical support layer is permanently thermally expanded radially after step d).

The thermal expansion may according to one variation be triggered by heating before the welding, but in this case the thermal expansion is either slow or delayed in response to the triggering such that the thermal expansion takes place after step d).

According to one example, the mechanical support layer is semiconducting, wherein the mechanical support layer electrically connects the metallic water blocking layer with the outer semiconducting layer.

According to one embodiment step c) comprises extruding the mechanical support layer radially outside of the outer semiconducting layer using an unexpanded polymer material.

One embodiment comprises before step d), providing a protective tape that is thermally stable at the welding temperature axially along an outer surface of the mechanical support layer, the protective tape being radially aligned with the opposing edges of the metallic sheet before step d).

The protective tape is arranged longitudinally extending and radially aligned with the weld seam formed when welding the opposing edges of the metallic sheet.

The risk of degradation of the filling material during welding can thereby be reduced.

The protective tape may for example be a carbon fibre tape or a carbon fibre reinforced polymer tape.

According to one embodiment in step c) the mechanical support layer is applied around the outer semiconducting layer as a tape comprising unexpanded polymer material or as a coating, comprising unexpanded polymer material, on the metallic sheet, wherein step e) is performed after step d).

Step e) may for example comprise heating the mechanical support layer by means of one or more induction heaters arranged around the metallic water blocking layer if the mechanical support layer is formed of tape or a coating.

The induction heating may be performed as the power cable is moved axially in a production line.

The unexpanded polymer material may comprise a blowing agent and/or TEM.

One embodiment comprises performing a diameter reduction of the metallic water blocking layer after step d).

Generally, all terms used in the claims are to be interpreted according to their ordinary meaning in the technical field, unless explicitly defined otherwise herein. All references to "a/an/the element, apparatus, component, means, etc. are to be interpreted openly as referring to at least one instance of the element, apparatus, component, means, etc., unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
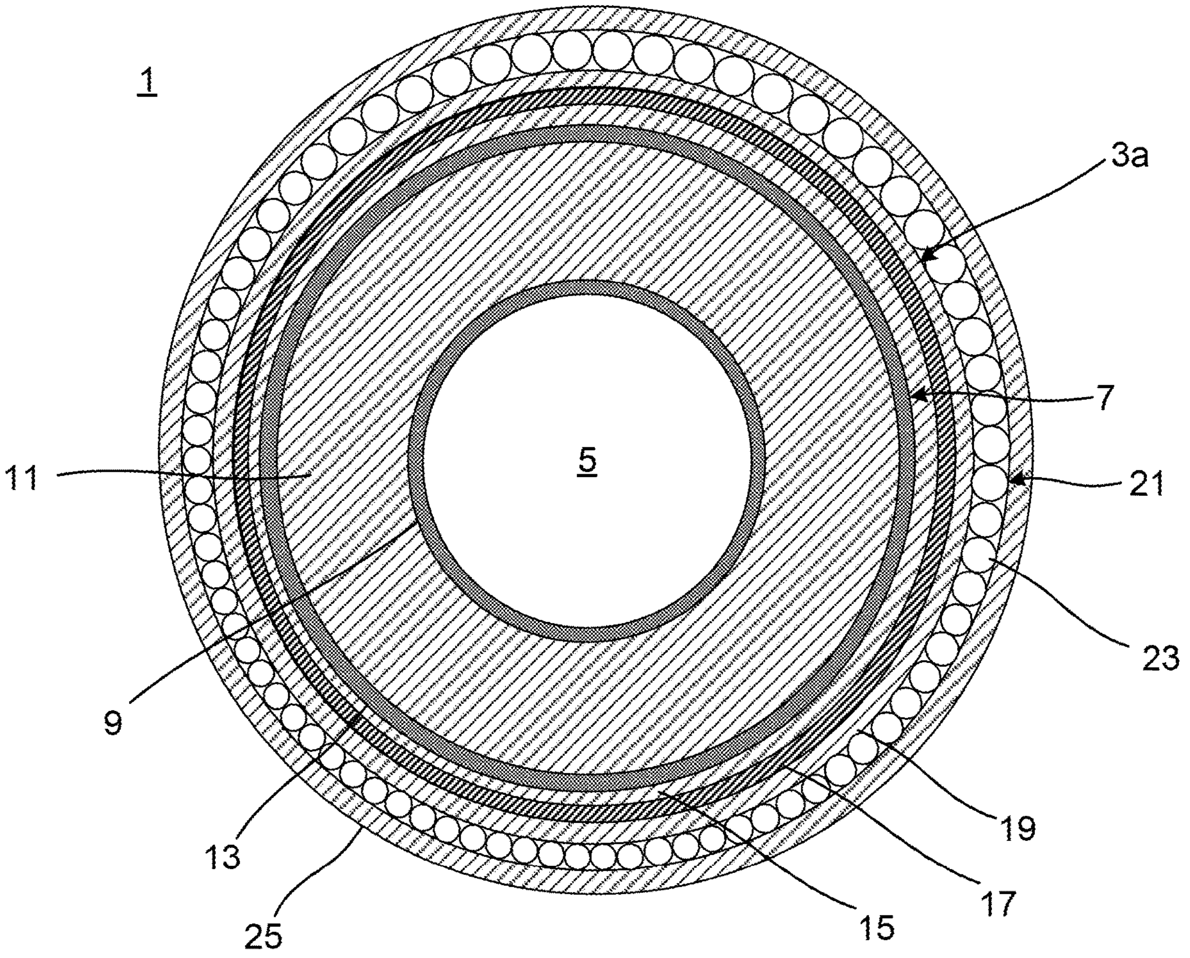
FIG. 1 schematically shows a cross section of an example of a power cable.

FIG. 1 schematically shows a cross section of an example of a power cable 1.

The power cable 1 comprises a power core 3*a*.

The power core 3*a* comprises a conductor 5. The conductor 5 may for example be solid, stranded, or of Milliken type. The conductor 5 is made of metal. The conductor 5 may for example comprise copper or aluminium.

The power core 3*a* comprises an insulation system 7.

The insulation system 7 comprises an inner semiconducting layer 9 arranged around the conductor 5. The inner semiconducting layer 9 may for example comprise cross-linked polyethylene (XLPE), polypropylene (PP), thermoplastic elastomer (TPE) which is based on PP random copolymer, ethylene propylene diene monomer (EPDM) rubber, or ethylene propylene rubber (EPR), mixed with a semiconductive component such as carbon black to form a semiconducting polymer, or a semiconducting paper. The semiconducting polymer may be extruded.

The insulation system 7 comprises an insulation layer 11. The insulation layer 11 is arranged around the inner semiconducting layer 9. The insulation layer 11 may be in direct contact with the inner semiconducting layer 9. The insulation layer 11 may for example comprise XLPE, PP, thermoplastic elastomer (TPE) which is based on PP random copolymer, EPDM rubber, or EPR, or paper. The insulation layer 11 may be extruded.

The insulation system 7 comprises an outer semiconducting layer 13 arranged around the insulation layer 11. The outer semiconducting layer 13 may be in direct contact with the insulation layer 11. The outer semiconducting layer 13 may for example comprise XLPE, PP, thermoplastic elastomer (TPE) which is based on PP random copolymer, EPDM rubber, or EPR, mixed with a semiconductive component such as carbon black to form a semiconducting polymer, or a semiconducting paper. The semiconducting polymer may be extruded.

The insulation system 7 may be a triple extruded insulation system.

The power core 3 comprises an elastic mechanical support layer 15 arranged radially outside of the outer semiconducting layer 13.

According to one example, the mechanical support layer 15 may be semiconducting.

The power core 3*a* comprises a metallic water blocking layer 17. The metallic water blocking layer 17 is arranged concentrically with and around the mechanical support layer 15.

The mechanical support layer 15 is arranged between the outer semiconducting layer 13 and the metallic water blocking layer 17.

The mechanical support layer 15 may have been thermally expanded by a factor of at least 2 due to a heat treatment process during the manufacturing of the power cable 1.

The mechanical support layer 15 mechanically supports the metallic water blocking layer 17.

The mechanical support layer 15 may comprise a polymer foam.

The polymer foam may for example comprise TEM embedded in a polymer matrix.

The polymer matrix may for example comprise polyethylene, polyurethane, polyvinylchloride, ethylene-vinyl acetate, polydimethylsiloxane, or epoxy.

According to one example the mechanical support layer 15 comprises an intumescent material. The intumescent material may comprise an acid source, a carbonization agent, and a blowing agent.

The mechanical support layer 15 may for example be an extruded layer, or it may be in the form of tape wrapped around the insulation system 7, or in the form of a coating on an inner surface of the metallic water blocking layer 17.

The metallic water blocking layer 17 may comprise a metal sheath. The metal may for example be aluminium, an aluminium alloy, copper, a copper alloy, or stainless steel.

The power core 3*a* comprises a polymer layer 19 arranged concentrically with and around the metallic water blocking layer 17. The polymer layer 19 may for example comprise XLPE, PP, EPDM or EPR.

The polymer layer 19 may be semiconducting.

According to one example, the polymer layer 19 may be bonded to the metallic water blocking layer 17 by means of glue. The glue is semiconducting if the polymer layer 19 is semiconducting.

The polymer layer 19 may be a polymer jacket.

The polymer layer 19 may be in direct contact with the outer surface of the metallic water blocking layer 17.

The polymer layer 19 may be extruded onto the metallic water blocking layer 17.

The power cable 1 may comprise an armour layer 21 arranged radially outside of the polymer layer 19.

The armour layer 21 comprises a plurality of armour wires 23 arranged helically around the polymer layer 19. The armour layer 21 may comprise armour wires 23 made of metal such as galvanized carbon steel, austenitic stainless steel, copper, or aluminium, and/or armour wires 23 made of synthetic material such as aramid fibres in a jacket.

In case at least some of the armour wires 23 are made of metal, the armour layer 21 may be covered in bitumen.

FIGS. 2*a*-2*d* show exemplary production steps for manufacturing the power cable 1.

Figure 2A:
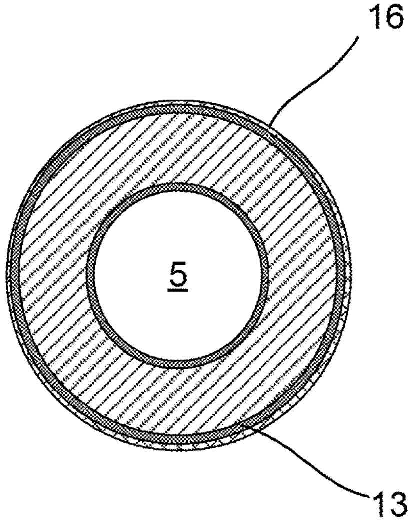
FIGS. 2*a*-2*d* schematically shows cross sections of various steps of manufacturing a power cable.

In the example in FIG. 2*a*, the mechanical support layer 15 is provided around the outer semiconducting layer 13.

The mechanical support layer 15 is in this example thermally unexpanded at this stage. The mechanical support layer 15 may comprise an unexpanded polymer material 16.

The mechanical support layer 15 may for example be in the form of tape that is wrapped around the insulation system 7.

Overlapping edges of the tape may be bonded to each other, for example by means of adhesive.

Figure 2B:
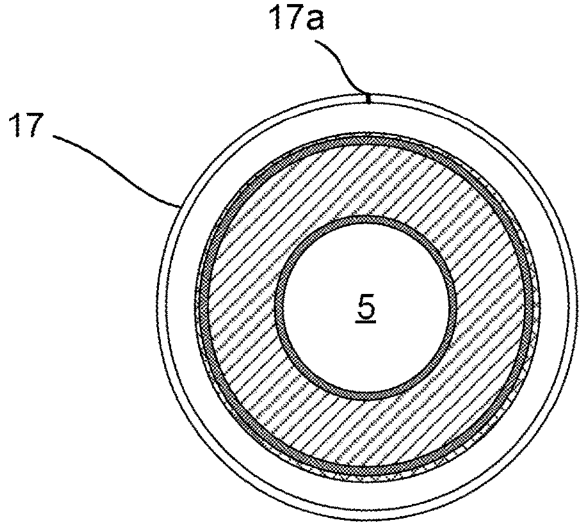

FIG. 2*b* illustrates when the metallic water blocking layer 17 has been formed around the mechanical support layer 15 which is still unexpanded.

The metallic water blocking layer 17 has been made by wrapping a metallic sheet around the unexpanded polymer material 16 at a radial distance from the unexpanded polymer material 16. Opposing edges of the metallic water blocking layer 17 have been welded longitudinally to form the weld seam 17*a*.

Figure 2C:
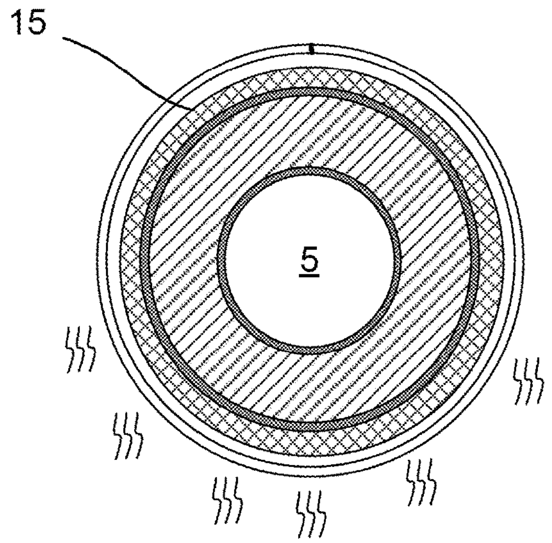

FIG. 2*c* shows when the structure obtained in FIG. 2*b* is subjected to heat treatment. This causes the unexpanded polymer material 16 to thermally expand permanently.

Figure 2D:
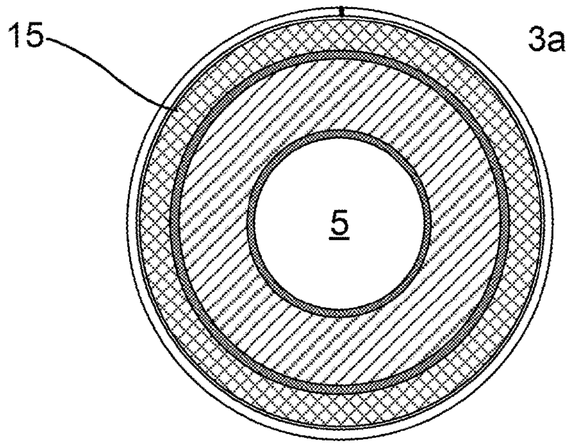

FIG. 2*d* shows when the heat treatment has been completed. The mechanical support layer 15 is in the example in direct contact with the inner surface of the metallic water blocking layer 17.

According to one variation, the metallic water blocking layer 17 may be subjected to a diameter reduction before or after the heat treatment to ensure that the mechanical support layer 15 is in direct contact with the inner surface of the metallic water blocking layer 17.

Figure 3:
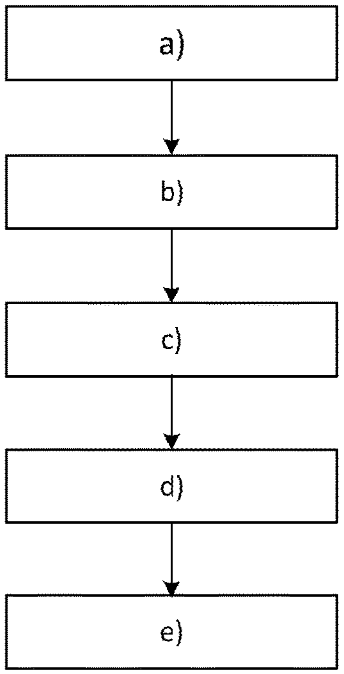
FIG. 3 is a flowchart of a method of manufacturing a power cable such as the power cable in FIG. 1.

FIG. 3 is a flowchart of a method of manufacturing the power cable 1.

In a step a) the conductor 5 is provided.

In a step b) the insulation system 7 is provided around the conductor 5. The insulation system 7 may for example be provided around the conductor 5 in a triple extrusion process or in a tape winding process.

In a step c) the mechanical support layer 15 is provided around the outer semiconducting layer 13 of the insulation system 7.

The mechanical support layer 15 may be extruded onto the insulation system 7 in step c). The mechanical support layer 15 is in this case subjected to thermal expansion after the extrusion process, preferably after a step d) of welding described below. The mechanical support layer 15 may be extruded using an unexpanded polymer material fed to the extruder, which is thermally expanded after step d) of welding.

A protective tape that is thermally stable at the welding temperature may be provided axially along an outer surface of the mechanical support layer 15 before the opposing edges of the metallic sheet are welded longitudinally in case the mechanical support layer 15 has been extruded. The protective tape is radially aligned with the opposing edges of the metallic sheet.

In a step d) the opposing edges of a metallic sheet are welded longitudinally to form the metallic water blocking layer 17.

In the case of a thermally expanded extruded mechanical support layer 15, the metallic sheet may be in physical contact or essentially be in physical contact with the mechanical support layer 15 during step d).

In a step e) the mechanical support layer 15 may be heated to thermally expand the mechanical support layer 15 permanently.

The thermal expansion may for example be with a factor of at least 2.

If the mechanical support layer 15 is formed of a tape, step c) may involve wrapping the tape longitudinally around the insulation system 7.

If the mechanical support layer 15 is formed as a coating on the metallic sheet, comprising unexpanded polymer material, step c) may involve wrapping the metallic sheet longitudinally around the insulation system 7 with the coating facing the insulation system 7.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A power cable comprising:

a conductor, an insulation system including an inner semiconducting layer arranged around the conductor, an insulation layer arranged around the inner semiconducting layer, and an outer semiconducting layer arranged around the insulation layer, an elastic mechanical support layer arranged around the outer semiconducting layer, and a metallic water blocking layer having a longitudinal weld seam, the metallic water blocking layer being arranged around the mechanical support layer, wherein the mechanical support layer is permanently thermally expanded radially with a factor of at least 2 as a result of a heat treatment process, thereby mechanically supporting the metallic water blocking layer, wherein the longitudinal weld seam is welded before permanent radial expansion of the mechanical support layer, wherein due to the elasticity of the mechanical support layer, the mechanical support layer is configured to dynamically expand and contract to fill a radial space between the outer semiconducting layer and the metallic water blocking layer as the insulation system thermally expands and contracts in response to a variation in a magnitude of a current that flows through the conductor during power cable operation, the thermal expansion differing from the permanent radial expansion of the mechanical support layer.

2. The power cable as claimed in claim 1, wherein the mechanical support layer comprises polymer foam.

3. The power cable as claimed in claim 2, wherein the polymer foam comprises thermally expandable microspheres, TEM, embedded in a polymer matrix.

4. The power cable as claimed in claim 3, wherein the polymer matrix includes polyethylene, polyurethane, polyvinylchloride, ethylene-vinyl acetate, polydimethylsiloxane, or epoxy.

5. The power cable as claimed in of claim 1, wherein the mechanical support layer comprises an intumescent material.

6. The power cable as claimed in claim 5, wherein the intumescent material comprises an acid source, a carbonization agent, and a blowing agent.

7. The power cable as claimed in claim 1, wherein the metallic water blocking layer includes copper, aluminium, or stainless steel.

8. The power cable as claimed in claim 1, wherein the mechanical support layer is semiconducting, and wherein the mechanical support layer electrically connects the metallic water blocking layer with the outer semiconducting layer.

9. The power cable as claimed in claim 1, wherein the power cable is a submarine power cable.

10. The power cable as claimed in claim 1, wherein the mechanical support layer is a tape layer wrapped around the insulation system.

11. A power cable comprising:

a conductor, an insulation system including an inner semiconducting layer arranged around the conductor, an insulation layer arranged around the inner semiconducting layer, and an outer semiconducting layer arranged around the insulation layer, an elastic mechanical support layer arranged around the outer semiconducting layer, the mechanical support layer comprising polymer foam which includes thermally expandable microspheres, TEM, embedded in a polymer matrix, and a metallic water blocking layer having a longitudinal weld seam, the metallic water blocking layer being arranged around the mechanical support layer, wherein the mechanical support layer is permanently thermally expanded radially as a result of a heat treatment process, thereby mechanically supporting the metallic water blocking layer, wherein the longitudinal weld seam is welded before permanent radial expansion of the mechanical support layer, wherein due to the elasticity of the mechanical support layer, the mechanical support layer is configured to dynamically expand and contract to fill a radial space between the outer semiconducting layer and the metallic water blocking layer as the insulation system thermally expands and contracts in response to a variation in a magnitude of a current that flows through the conductor during power cable operation, the thermal expansion differing from the permanent radial expansion of the mechanical support layer.

12. The power cable as claimed in claim 11, wherein the polymer matrix includes polyethylene, polyurethane, polyvinylchloride, ethylene-vinyl acetate, polydimethylsiloxane, or epoxy.

13. A power cable comprising:

a conductor, an insulation system including an inner semiconducting layer arranged around the conductor, an insulation layer arranged around the inner semiconducting layer, and an outer semiconducting layer arranged around the insulation layer, an elastic mechanical support layer arranged around the outer semiconducting layer, and a metallic water blocking layer having a longitudinal weld seam, the metallic water blocking layer being arranged around the mechanical support layer, the mechanical support layer comprising an intumescent material which includes an acid source, a carbonization agent, and a blowing agent, wherein the mechanical support layer is permanently thermally expanded radially as a result of a heat treatment process, thereby mechanically supporting the metallic water blocking layer, wherein the longitudinal weld seam is welded before permanent radial expansion of the mechanical support layer, wherein due to the elasticity of the mechanical support layer, the mechanical support layer is configured to dynamically expand and contract to fill a radial space between the outer semiconducting layer and the metallic water blocking layer as the insulation system thermally expands and contracts in response to a variation in a magnitude of a current that flows through the conductor during power cable operation, the thermal expansion differing from the permanent radial expansion of the mechanical support layer.

* * * * *